(12) United States Patent
Kuns et al.

(10) Patent No.: US 8,520,831 B2
(45) Date of Patent: Aug. 27, 2013

(54) METHOD OF UNIFYING CONTROL OF CONTACT CENTER SYSTEM

(75) Inventors: Edward W. Kuns, Glen Ellyn, IL (US); Biswajeet Mukherjee, Palatine, IL (US); Robert Owens, Franklin, TN (US)

(73) Assignee: Aspect Software, Inc., Chelmsford, MA (US)

( * ) Notice: Subject to any disclaimer, the term of this patent is extended or adjusted under 35 U.S.C. 154(b) by 1378 days.

(21) Appl. No.: 12/141,687

(22) Filed: Jun. 18, 2008

(65) Prior Publication Data

US 2009/0316879 A1 Dec. 24, 2009

(51) Int. Cl.
*H04M 3/00* (2006.01)
*G06F 15/173* (2006.01)

(52) U.S. Cl.
USPC ............ 379/265.02; 709/223; 709/224

(58) Field of Classification Search
USPC .......... 379/265.01, 265.02, 265.09; 709/201, 709/203, 223, 224
See application file for complete search history.

(56) References Cited

U.S. PATENT DOCUMENTS

| 5,721,825 | A | * | 2/1998 | Lawson et al. | 709/203 |
| 5,958,014 | A | * | 9/1999 | Cave | 709/229 |
| 6,453,356 | B1 | * | 9/2002 | Sheard et al. | 709/231 |
| 7,720,047 | B1 | * | 5/2010 | Katz et al. | 370/351 |
| 8,027,659 | B1 | * | 9/2011 | Daly et al. | 455/404.1 |
| 2004/0034703 | A1 | * | 2/2004 | Phadke | 709/224 |
| 2004/0139076 | A1 | * | 7/2004 | Pendleton | 707/10 |
| 2006/0221941 | A1 | * | 10/2006 | Kishinsky et al. | 370/352 |
| 2007/0036331 | A1 | * | 2/2007 | Fitzgerald | 379/265.02 |
| 2007/0274505 | A1 | * | 11/2007 | Gupta et al. | 379/265.01 |

* cited by examiner

*Primary Examiner* — Duc Nguyen
*Assistant Examiner* — Sonia Gay
(74) *Attorney, Agent, or Firm* — Husch Blackwell LLP

(57) ABSTRACT

A method and apparatus are provided for processing messages in a networked automatic contact distribution system having a plurality of computer processors. The method includes the steps of a processor of the plurality of processors receiving a configuration message, the processor determining a type of the configuration message from metadata contained within the message and the processor executing a predetermined set of steps based upon the determined type of the configuration message.

29 Claims, 2 Drawing Sheets

METHOD OF UNIFYING CONTROL OF CONTACT CENTER SYSTEM

FIELD OF THE INVENTION

The field of the invention relates to communication system and, more particularly, to automatic contact distributors.

BACKGROUND OF THE INVENTION

Call centers are generally known. Call centers are typically used wherever an organization has occasion to handle a multitude of individual contacts with clients. Usually, the organization will hire a number of agents to interact with clients.

Contacts between the organization and clients may be handled under any of a number of different communication mediums. For example, contacts may be initiated through the public switch telephone network (PSTN) by a client calling a telephone number provided by the organization. Alternatively, the organization may place telephone calls to its clients. In either case, connection of the telephone call with an agent may be handled by an automatic call distributor (ACD).

Similarly, contacts with clients through the Internet may be handled by a host of a contact center. Contacts in this case may be handled under a voice format (e.g., VoIP) or under a text format (e.g., e-mail, chat, etc.).

Once a call is detected, the ACD may select an agent to handle the call. The agent may be selected based upon qualifications in handling the type of call involved, based upon experience with the client involved or based upon idle time. Once an agent is selected, the ACD may automatically route the call to a telephone of the selected agent.

In order to serve large markets, ACDs are often used as networked systems with locations in many different areas. When used in such a context, the message traffic among ACDs becomes significant. Because of the importance of networked ACDs, a need exists for methods of reducing traffic among ACDs in networked systems.

SUMMARY

A method and apparatus are provided for processing messages in a networked automatic contact distribution system having a plurality of computer processors. The method includes the steps of a processor of the plurality of processors receiving a configuration message, the processor determining a type of the configuration message from metadata contained within the message and the processor executing a predetermined set of steps based upon the determined type of the configuration message.

DETAILED DESCRIPTION OF AN ILLUSTRATED EMBODIMENT

While call centers work well, they are constantly evolving and, in some cases, require replacement or expansion. When a call center made by a first call center provider must be replaced or expanded, the organization will often consider and may, in fact, purchase a call center from a competitor for use with existing, legacy call centers because of a lower price.

However, the software and operating philosophy used to control call centers may be radically different among call center providers. In order to allow call centers to exchange information, a software adapter or terminal adapter may be needed to allow a first call center to exchange information with a second call center.

Moreover, the information exchanged among call centers may be extensive. For example, agents often possess specialized knowledge that may be needed by clients throughout the call center system even though an agent with specialized knowledge may work at only one call center. In this case, the agent may be shared among the call centers of the call center system.

In order to share agents among call centers, a great deal of information must be shared among the call centers. Whenever a shared agent signs into the system, the information must be shared among the call centers. If the agent is assigned to a call, then the other call centers must be notified so that they don't assign another call at the same time.

Other information that may need to be shared among call centers may include an identification of call groups and the skills possessed by each a call group. The identification of call groups and skills possessed by the call group is important in selecting a call group to handle a call. Information that may also be shared among call centers may include supervisor assignments and telephone directory information.

Figure 1:
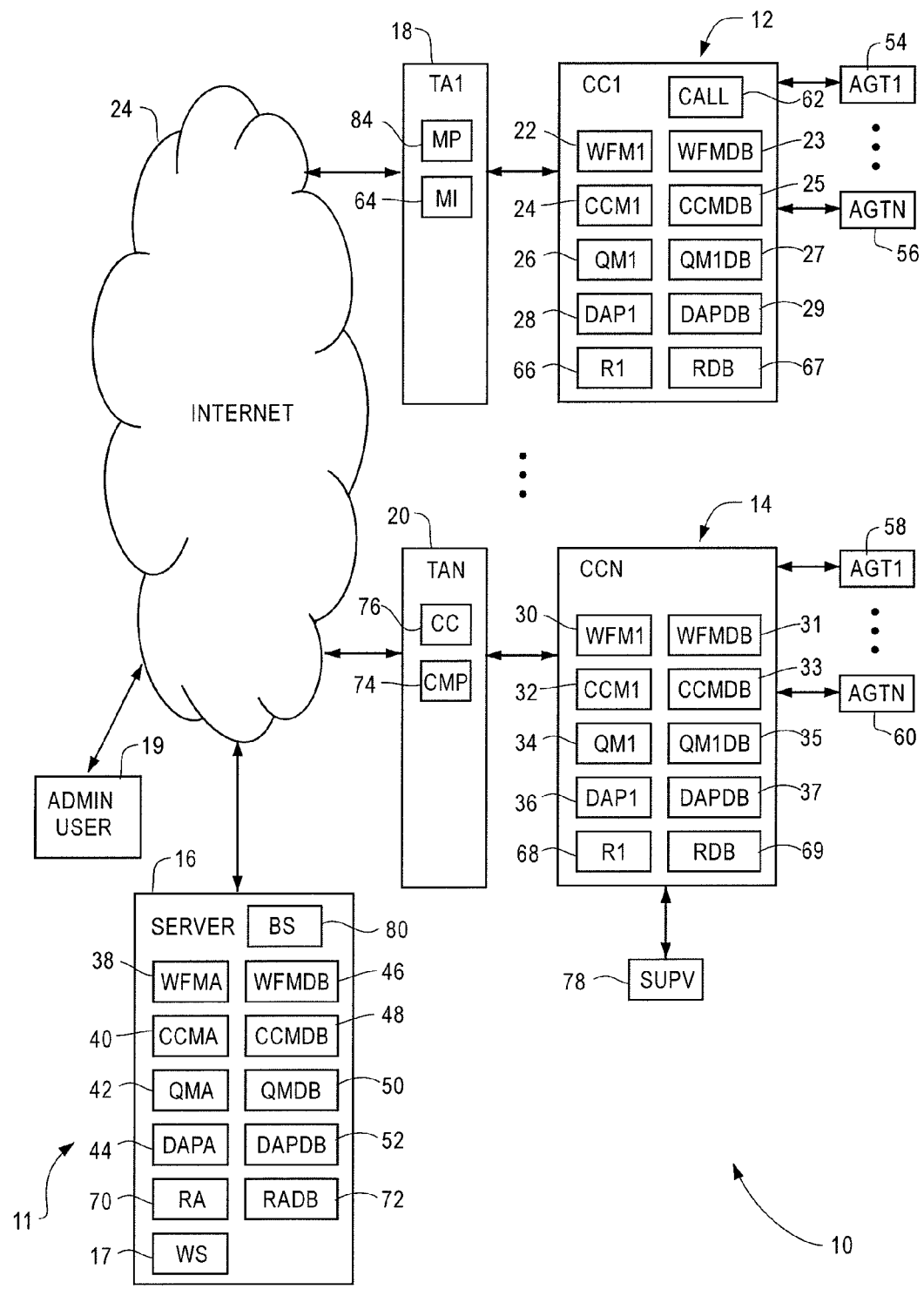
FIG. 1 is a block diagram of an automatic contact distribution system in accordance with an illustrated embodiment of the invention.

FIG. 1 is a block diagram of a call center system 11 that addresses these problems shown generally in accordance with an illustrated embodiment of the invention. Included within the call center system is an administration system (admin system) 10 for administering operation of a number of dissimilar call centers 12, 14 of the call center system. While FIG. 1 shows only two call centers 12, 14, it should be understood that the call center system of FIG. 1 may include any number of call centers 12, 14. Moreover, the term "dissimilar call centers" should be understood to mean call centers that do not share the same command and control structure. For example, a First Point Spectrum ACD call center made during the late 1990s does not use the same command and control structure as an Aspect ACD made during the same time period.

Under the embodiment illustrated in FIG. 1, the admin system 10 may include an admin server 16 coupled to the call centers 12, 14 through the Internet 24 and a respective terminal adapter 18, 20. One or more administrative persons (users) working through a terminal (the person and terminal together hereinafter referred to as an "admin user") 19 may access a website 17 of the server 16 through the Internet 24. The operation of the call centers 12, 14 may be controlled through the activities of an administrative user 19 through the server 16. While the admin user 19 and server 16 are shown connected through the Internet 24, the admin user 19 may be co-located and be directly connected to the server 16.

While the call centers 12, 14 may be different in structure and operation, the use of the terminal adapters 18, 20 may allow the system of FIG. 1 to be operated as if it were one large call center. Moreover, the server 16 may have a completely different control structure than any of the call centers 12, 14 where there is nothing in common among the call centers 12, 14. This allows the server 16 to operate under a "best of breed" philosophy where the terminal adapters 18, 20 accommodate any differences.

Included within the terminal adapters 18, 20 may be a configuration message processor 74 that controls processing and/or forwarding of configuration messages based upon a type of the configuration message. The type of a configuration messages is determined by matching metadata contained within the configuration messages with criteria contained within a configuration message processing table. One or more subroutines may be associated with each message type that may then be used to process the configuration message in accordance with the determined type of configuration message.

The configuration message processor 74 functions as a programmable interface that controls the flow of configuration messages among the different parts of the call center system 11. For example, if an agent is to be shared among more than one call center 12, 14, then information about the agent (e.g., an agent's directory number, group assignment, supervisor assignment, skills, etc.) would need to be shared among the call centers 12, 14. However, if an agent were not shared, then any configuration messages about the agent would not be relevant to any of the other call centers 12, 14 and would simply add to the traffic among the other call centers 12, 14.

In simple conceptual terms, the admin system 10 sits on top of existing administrative interface applications and databases of the call centers 12, 14. "Sitting on top of" means that the administrative interfaces and databases of the call centers 12, 14 do not rely upon the admin system 10 for proper operation. The admin system 10 uses the interfaces of the call systems 12, 14 to read data from their databases and to write changes into them, but it does not attempt to replace them. Instead, the admin system 10 acts as a web wrapper, providing a unified view of administrative data, but not requiring any changes to the existing systems 12, 14. As much as possible, admin system 10 simply acts as another client to the current administrative interfaces of the call centers 12, 14, which allows existing administrative tools to continue working independently, particularly in the case where the connection of the call centers 12, 14 with the admin system 10 is lost.

In effect, the admin system 10 controls the call centers 12, 14 by changing the data within the databases of the call centers 12, 14. This has the advantage that the call centers 12, 14 function properly without any other input or control from the admin system 10. If the admin system 10 should malfunction or otherwise become inoperative, then data may be entered directly through existing admin services available within the call centers 12, 14.

Since the server 16 merely changes data within the call centers 12, 14, there is no limit to the number of servers 16 within the system of FIG. 1. While one is shown in FIG. 1, the system of FIG. 1 may contain two or more.

The ability to read data from the call centers 12, 14 allows resources to be shared among call centers 12, 14. For example, the entire list of agents 54, 56, 58, 60 may be visible through the server 16. However, some agents may be better skilled than others. Alternatively, some agents may have specific skills that are more in demand than others. In these cases, some agents may be shared among call center products and centers and some may not be shared.

In addition, there are other extraordinary circumstances where agents may need to be shared, such as hardware or power failures at some locations. Other extraordinary where agent sharing may be necessary may include loss of network connectivity or natural disasters.

Where extraordinary circumstances occur, call centers may need to rapidly reconfigure their agent populations. For example, if due to natural disaster (e.g., an earthquake), the call center system 11 should loose one or more of the call centers, then the system 11 may need to be reconfigured to continue operation. Agents of the remaining call centers may need to be reapportioned or assigned to different agent groups to better serve the remaining system load.

In general, the call centers 12, 14 may rely upon a number of database interfaces. In one embodiment, five administrative interface applications may be used. The five are: 1) a work force management (WFM) interface 22, 30; 2) a call center management interface 24, 32; 3) a quality management interface 26, 34); 4) a directory access protocol (DAP) interface 28, 36 and 5) a reporting database interface 66, 68. The WFM interface 22, 30 provides access to a WFM database 23, 31 within the call center 12, 14 and is used by a WFM application within the respective call centers 12, 14. The WFM application operates on a first level to maintain a list of signed-in agents and also to predict a work force (e.g., the number of agents) needed during any one time period based upon historical records and current predictions. The WFM may also monitor call queues of each agent group to determine how long calls remain in queue for the group and other statistics about agent performance. Other statistics may include calls per hour, abandoned calls, average call handling time, identifiers of agent groups and an identifier of each agent assigned to each of the identified agent groups.

The call center management interface 24, 32 provides access to a call management database 25, 33 within each respective call center 12, 14. The call management database 25, 33 is used by a call management application to maintain a list of agents and the qualification of each agent. The call management application may also be used to select agents to handle calls based upon any appropriate method (e.g., agent idle time, agent skill, etc.). The call management application may also track agent availability.

The quality management interface 26, 34 provides access to a quality management database 27, 35 within each of the respective call centers 12, 14. The quality management database 27, 35 is used by a quality management application to record calls and other data about call handling by agents.

The directory access protocol interface 28, 36 provides access to a directory access protocol database, 29, 37. The directory access protocol database 29, 37 may be accessed by a lightweight directory access protocol (LDAP) to provide access control to the call centers 12, 14. The directory access protocol database contains a list of users, passwords and access rights of each user.

The reporting interface 66, 68 provides access to a report database 67, 69 (e.g., viewpoint, datamart, etc). The report databases 67, 69 may collect data regarding any of a number of call center operations (e.g., agent performance, call statistics, etc.). Reporting data may be collected from other interfaces 22, 30; 24, 32; 26, 34; 28, 36 or may be generated independently.

Located within the server 16 may be a respective workforce management application (WFMA) 38, a call center management application (CCMA) 40, a quality management application (QMA) 42, a data access protocol application (DAPA) 44 and a reporting application 70. Each of the applications 38, 40, 42, 44, 70 are accessible by the admin user 19 through the website 17. The applications 38, 40, 42, 44, 70 serve at least some of the same function as the respective applications 22, 30; 24, 32; 26, 34; 28, 36; 66, 68 of the call centers 12, 14 except that at least some of the respective applications of the call centers 12, 14 operate under a different protocol than the respective applications 38, 40, 42, 44, 70 of the admin server 16.

The applications 38, 40, 42, 44, 70 of the server 16 differ from the corresponding applications 22, 30; 24, 32; 26, 34; 28, 36; 66, 68 of the call centers 12, 14 in that they operate over a larger database and, therefore, can achieve economies of scale and efficiency that are not possible by the call centers 12, 14 working in isolation.

In general, access to the call centers 12, 14 by the applications 38, 40, 42, 44, 70 of the server 16 is provided through a respective terminal adapter 18, 20. In each case, instructions from the applications 38, 40, 42, 44, 70 are executed on the call centers 12, 14 by mapping the instructions from the protocol of the server 16 to the respective protocols of the call centers 12, 14 within a mapping processor 84 of the respective terminal adapters 18, 20. Once an instruction from an application 38, 40, 42, 44, 70 has been mapped to the appropriate protocol, the instruction may be executed by the respective database interfaces 22, 30; 24, 32; 26, 34; 28, 36; 66, 68.

Instructions from the server 16 to the call centers 12, 14 may involve and cause a change to the respective databases 23, 25, 27, 29, 31, 33, 35, 37, 67, 69 of the call center 12, 14 or may be a request for data from the database. Where the request is for data, the database interface 22, 30; 24, 32; 26, 34; 28, 36; 66, 68 may retrieve the requested data and compose a message to send the requested data back to the requester.

As the data message is returned, the message may arrive at the terminal adapter 18, 20 providing the original instruction. In response, the terminal adapter 18, 20 may reformat the data message into a format of the admin server 16.

Included within the admin server 16 may be one or more databases 46, 48, 50, 52, 72 that correspond to the applications 38, 40, 42, 44, 70. Under one illustrated embodiment, all or a portion of the data within the respective databases 23, 25, 27, 29, 31, 33, 35, 37, 67, 69 associated with the call centers 12, 14 may be substantially duplicated within respective databases 46, 48, 50, 52, 72 of the admin server 16. In this regard, data from WFM databases 23, 31 may be merged with the corresponding WFM database 46 to form a consolidated database of WFM information. Similarly, data from the CCM databases 25, 33 may be merged in CCM database 48, data from QMI databases 27, 35 may be merged in QMI database 50, data from DAP databases 29, 37 may be merged in DAP database 52 and data from the reporting databases 67, 69 may be merged in reporting database 72. This may be accomplished by the application 22, 30; 24, 32; 26, 34; 28, 36 associated with the database interfaces tracking and forwarding the changes or by the applications 38, 40, 42, 44 periodically requesting such data.

By having a duplicate of the data within the call centers 12, 14, the admin server 16 is able to control the overall allocation of resources within the call center system 11. For example, agents 54, 56 may be physically connected to call center 12 and agents 58, 60 may be physically connected to call center 14. In addition, some agents (local area network (LAN) agents) may not have a physical connection to any call center, and can be quickly and easily moved from call center to call center regardless of physical location. However, agents 54, 56, 58, 60 may also be shared by all call centers 12, 14. The sharing of agents among call centers 12, 14 is important because loading is not always equal among call centers. In addition, not all agents have equal skills or equally important skills. Agents 54, 56, 58, 60 with greater or rarer skills are often put to greater use when shared among a larger client base. This can be especially important during extraordinary circumstances where due to hardware or electric failures or telephone or Internet outages at a single site or at a few sites, agents must be reassigned in support of continued operation.

However, the design supports an embodiment where the database is not replicated in the admin server and instead, it relies upon the call center product databases 23, 25, 27, 29, 31, 33, 35, 37, 67, 69 to be the only persistent storage of their data.

An admin user 19 may access the workforce management application 38 within the admin server 16 and can view the overall workforce status of the system of FIG. 1. For example, on a first screen, the user 19 may view a list of agents 54, 56, 58, 60 logged into the system of FIG. 1. On another screen, the user can view the performance of each call center 12, 14. More specifically, the availability of data from the WFM database 23 allows the admin user 19 to view such performance statistics such as average delay to answer, the average call handling time, schedule adherence metrics, etc. By viewing performance statistics, such as call queues, the admin user 19 has the ability to determine whether the call centers 12, 14 are performing at an optimum level, are overloaded or are under utilized.

Moreover, where the admin user 19 should detect that a call center 12, 14 is overloaded, the admin user 19 may simply log onto the call center management application 40 and transfer agents. For example, if a first set of agents 54, 58 were assigned to a first agent group (group "A") and a second set of agents 56, 60 were assigned to a second agent group (group "B") and group A were overloaded, then the admin user 19 could reassign agents as needed. In this example, the admin user 19 would log into the call center management application 40 and select group B and delete agent 60. The admin user 19 may then select group A and add agent 60. In both cases, the deletion and addition steps would cause an instruction to be generated by the call center management application 40 that would be transferred to and executed by the call centers 12, 14.

In order to control the proliferation of configuration messages, the configuration message processor 74 within each terminal adapter 18, 20 may receive and process configuration messages 101 arriving from the admin system 10 or from the respective call center 12, 14. In order to receive configuration messages, the configuration message processor 74 may open one or more communication channels or sockets (e.g., a TCP/IP port, IP multicast port, UDP port, wireless port, etc.) 76 within a terminal adapter 18, 20 for purposes of monitoring for configuration messages.

Figure 2:
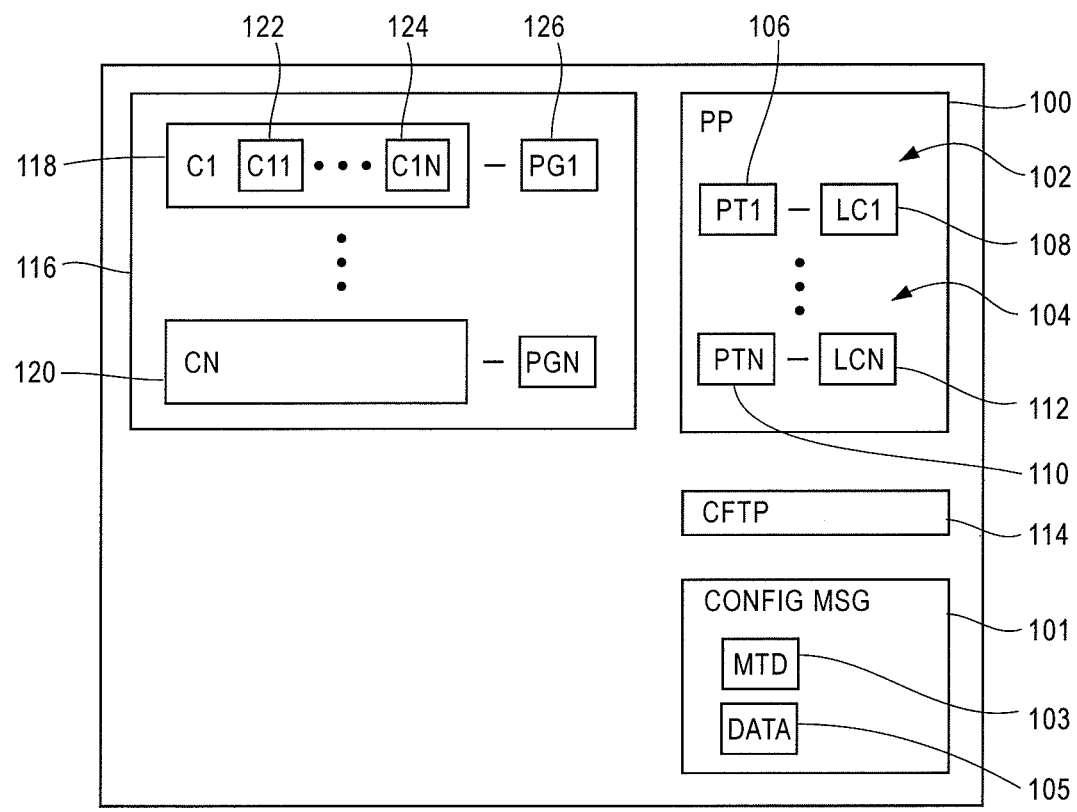
FIG. 2 is a block diagram of a configuration message processing system used by the system of FIG. 1.

FIG. 2 is a block diagram of a configuration message processor 74. Included within the configuration message processor 74 may be a protocol processor 100 that identifies a protocol of the configuration message. For example, a configuration message from a First Point Spectrum call center may use a different proprietary protocol for configuration messages than an Aspect ACD. The protocol processor 100 may determine a protocol of the configuration messages by analyzing a preamble of the configuration message.

In addition to determining the protocol of any received configuration messages 101, the protocol processor 74 may also identify a location within the message where metadata 103 resides. The metadata 103 may be used to identify the type of configuration message 101 involved. As a first step, the protocol of the message 101 may be determined from a table of protocol files 102, 104 within a memory by comparing the preamble of a message with a set of distinguishing characteristics of each protocol. In this regard, the first data field 106, 110 of the file 102, 104 may contain an identifier and identifying characteristics (e.g., a model preamble) of a protocol and a second data field 108, 112 may identify a location of the metadata 103 within the message 101.

Once the location of the metadata 103 has been determined, a configuration message type determining or classification processor 114 may retrieve the metadata 103 and determine a type of configuration message involved. The typing processor 114 may determine the type of configuration message 101 by comparing the metadata 103 with a set of criteria 118, 120 where a criteria 118, 120 is provided for each type of configuration message 101 that is to be identified.

It should be noted that the metadata 103 may include a single field or may include a number of fields. Accordingly, classification of the configuration message 101 into one of many types may include a comparison of the metadata 103 with a single criterion 120 or the comparison may involve a criteria 118 with a number of tests 122, 124 where each test involves a comparison and possibly matching of each criterion 122, 124 with a content of a respective field of the metadata 103.

Associated with each criteria 118, 120 is a respective software processing module (e.g., software routine, subroutine, etc.) 126, 128. The determination of the type of configuration message 101 by matching of a message 101 with a criteria 118, 120, in turn, activates the respective processor 126, 128 to perform some act or set of predetermined steps regarding the configuration message 101. The act may be to delete the configuration message 101 or the act may be to send the configuration message 101 to some other predetermined destination within the system 11.

For example, the configuration message 101 may be an agent 54 logging out of the call center 12. When the agent 54 signs out of the call center 12, a sign off message is sent from a terminal of the agent 54 to the WFM interface 22. In response, the WFM interface 22 may determine what agent groups that the agent 54 is logged into and remove the agent's name from the list of active agents for the respective groups.

In addition, the WFM interface 22 may also compose a system configuration message 101 removing the agent 54 from any system lists. If the call center 12 is a First Point Spectrum ACD call center, then the configuration message 101 would be composed under the First Point protocol. If the call center 12 is an Aspect ACD call center, then the configuration message 101 would be composed under the Aspect protocol. The composed configuration message 101 would contain a field of metadata 103 in the appropriate location identifying the configuration message 101 as an agent sign off.

As mentioned above, the metadata 103 of the composed message 101 may include a number of fields. The fields may include a first field that identifies the message 101 as a sign off message from an agent. Other fields may include an identifier of the agent group and an identifier of the agent 54. The fields may also include an identifier of the call center 12 if not apparent from the content of the preamble.

Once the configuration message 101 has been composed, the WFM interface 22 may publish the message 101. Publishing the message 101 means that the message 101 is sent to the terminal adapter 18.

Within the terminal adapter 18, the message may be sent to the configuration message processor 74. The protocol processor 100 within configuration processor 74 may first determine the protocol of the message 101 from the preamble and the location of the metadata 103 from the determined protocol. Upon determining the location of the metadata 103, the protocol processor 100 may retrieve the metadata 103 from the message 101 and transfer it to the classification processor 114.

Within the classification processor 114, the metadata 103 may be compared with the criteria 118, 120 for determination of the type of message involved. It should be noted, in this case, that more than one match is possible.

For example, a first criteria (e.g., criteria 120) and associated software module 128 may be used to update the WFM database 46 on the server 16. Another criteria (e.g., criteria 118) and associated software module 126 may be used to log the agent 54 out of another call center 14 in the case where the agent 54 is shared among call centers 12, 14.

In the case of the WFM database 46, the criteria 120 may only include indication that the configuration message is a log off message. This would be the case because the WFM database 46 would want to receive log off messages from any call centers 12, 14.

In the case of shared agents, the criteria 118 may include the identifier of the call center 12, the identifier of the call group and the identifier of the agent 54. In this case, the criteria 118 would be more extensive because the call center 14 would only want to receive log off messages from the other call center 12 if the agent 54 were shared.

In either case, the classification processor 114 may match the configuration message with the first and second criteria 118, 120. In response, the classification processor 114 may transfer the configuration message 101 to the respective software modules 126, 128 for processing.

Upon the receiving the configuration message 101, the first module 126 may reformat the configuration message 101 for transfer to the WFM application 38. Reformatting, in the case, may mean altering the message 101 by adding the destination address of the WFM application 38 to the message 101. The first module 126 may then re-send the altered message 101 through the communication channel 76. Upon receiving the altered message 101, the WFM application 38 may delete the agent 54 from a list of active agents within the database 46.

Similarly, the second module 128 may reformat the configuration message 101 for transfer to the WFM application 30 within the other call center 14. Reformatting, again, may mean altering the message 101 by adding the destination address of the WFM application 30 to the message 101. The second module 128 may then re-send the altered message 101 through the communication channel 76. Upon receiving the altered message 101, the WFM application 30 may delete the agent 54 from a list of active agents within the database 31.

In another example, a call center supervisor working through a terminal 78 may transfer an agent (e.g., agent 58) from a first call group to a second call group. In order to efficiently manage operation of the call center system 11, the server 16 must always be notified of such changes. In this case, the supervisor 78 may access the WFM interface 30, select the agent 58 and transfer the agent 58.

In response, the WFM interface 30 may delete the agent 58 from a list of agents for the first call group and add the agent 58 to a list of agents for the second call group within the WFM database 31. In addition, the WFM interface 22 may compose and send a system configuration message 101 to the terminal adapter 20 announcing the change. The system configuration message 101 would include an identifier that the change is an agent transfer, an identifier of the agent, an identifier of any source group and an identifier of a destination group.

Within the terminal adapter 20, the configuration message processor 74 may receive the message 101 and recover the metadata 103 as discussed above. The metadata 103 may also be transferred to the classification processor 114, as described above, where the metadata 103 is compared with the matching criteria 118, 120.

The matching criteria 118, 120 would include at least the identifier of the message 101 as being an agent transfer. The associated software module 126, 128 would alter the message 101 to re-route the message 101 to the WFM application 38 and send the altered message 101 as discussed above. The WFM application 38 would receive the altered message and make the appropriate changes in the agent lists within the WFM database 46.

In another example, an agent working through a terminal 60 having no system access may access a data access protocol interface 36 and change his password. In response, the data access protocol interface 36 may enter the password change and compose and send a system configuration message 101 to the terminal adapter 20 announcing the change. The system configuration message 101 would include at least an identifier of the agent, an old password and a new password within the metadata 103.

Within the terminal adapter 20, the configuration message processor 74 may receive the message 101 and recover the metadata 103 as discussed above. The metadata 103 may also be transferred to the classification processor 114, as described above, where the metadata 103 is compared with the matching criteria 118, 120. However, since the agent 60 has no system access, the metadata 103 from the password change would not find a match within the criteria 118, 120. Since a match was not found the configuration message 101 would be discarded.

In another example, an admin user working through a terminal 19 having universal access may access a data access protocol interface 44 and change his password. In response, the data access protocol interface 44 may enter the password change and compose and send a system configuration message 101 to the terminal adapters 18, 20 announcing the change. The system configuration message 101 would include at least an identifier of the admin user 19, an old password and a new password within the metadata 103.

Within the terminal adapters 18, 20, the configuration message processor 74 may receive the message 101 and recover the metadata 103 as discussed above. The metadata 103 may also be transferred to the classification processor 114, as described above, where the metadata 103 is compared with the matching criteria 118, 120. In this case, since the admin user 19 has universal access, the metadata 103 from the password change would find a match within the criteria 118, 120. Since a match was found the configuration message 101 would be forwarded to the respective data access protocol interfaces 28, 30 the respective data access protocol interfaces 28, 30 would enter the password change in the respective data access protocol databases 29, 37.

As another example, the supervisor 78 may hire a new agent 58 and may want to register the agent 58 with the system 11. Registration may require that the new agent 58 be added to the WFM database 31. It would also be necessary that the new agent 58 be added to a business system 80 that tracks the activity of the agent (e.g., sales).

In order to add the agent 58, the supervisor 78 may log into the WFM interface 30 and open a new agent file. The supervisor 78 may enter a name of the agent 58 and any other information relevant to registering the agent 58.

In response, the WFM interface 30 may enter the information of the new agent 58 within the WFM database 31 and generate a configuration message 101. The configuration message 101 may include, as metadata 103, at least an identifier that the message is an agent registration message.

The message 101 may be received by the configuration message processor 74. The configuration processor 74 may retrieve the metadata 103 and transfer the metadata 103 to the classification processor 114. The classification processor 114 may compare the metadata 103 to the criteria 118, 120.

In this case, at least one of the criteria 118, 120 would be a requirement that new agents be registered with the business system 80. The criteria 122, 124 may simply be that any new agent configuration messages are to be forwarded to the business system 80. Accordingly, the criteria 122, 124 is simply a match between a new agent indicator in the metadata 103 and a new agent criteria 122, 124.

In other examples, the supervisor 78 may transfer an agent or agents from one group to another group. Similarly, the supervisor 78 may change the skills associated with a group or change an agent's supervisor. Similarly, the supervisor 78 may copy an agent from one call center to another to facilitate sharing.

A specific embodiment of method and apparatus for controlling the proliferation of configuration messages in a call center has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing messages in a networked automatic contact distribution system having a plurality of computer processors each using a protocol of a plurality of protocols comprising:
   a processor of the plurality of processors receiving a configuration message composed in one of the plurality of protocols;
   the processor determining the protocol of the configuration message out of the plurality of protocols by comparing a preamble of the configuration message with a set of distinguishing characteristics of each of the plurality of protocols, and identifying a location of metadata contained within the configuration message based upon the protocol of the configuration message;
   the processor determining a type of a plurality of types of the configuration message from the metadata contained within the message; and
   the processor executing a predetermined set of steps based upon the determined type of the configuration message.

2. The method of processing messages as in claim 1 further comprising reformatting the configuration message after determining the type of the configuration message.

3. The method of processing messages as in claim 1 wherein the step of determining the type further comprises matching the metadata with a respective criteria for each of a plurality of predetermined types of configuration messages.

4. The method of processing messages as in claim 3 wherein the step of matching the metadata with the criteria further comprises activating a subroutine associated with the matched criteria.

5. The method of processing messages as in claim 4 wherein the step of receiving a configuration message further comprises opening a socket to a second processor of the plurality of processors under a protocol selected from the group consisting of TCP/IP, IP multicast, UDP and wireless.

6. The method of processing messages as in claim 5 wherein the configuration message further comprises a new agent registration message and wherein the subroutine registers the new agent with a business system.

7. The method of processing messages as in claim 5 wherein the configuration message further comprises an agent logging out of an automatic contact distributor of the networked automatic contact distribution network and wherein the subroutine removes the agent from an agent's list within another automatic call distributor of the networked automatic contact distribution network.

8. The method of processing messages as in claim 5 wherein the configuration message further comprises an agent changing his password and wherein the subroutine writes a new password selected by the agent into a plurality of databases based upon the access privileges granted to the agent.

9. The method of processing messages as in claim 1 wherein the processor further comprises a terminal adapter coupled to an automatic contact distributor where the terminal adapter is disposed between an automatic contact distributor and an administrator of the of the networked automatic contact distribution system.

10. The method of processing messages as in claim 1 further comprising moving an agent from one group to another group.

11. The method of processing messages as in claim 1 further comprising changing the skills associated with a group.

12. The method of processing messages as in claim 1 further comprising changing an agent's supervisor assignment.

13. The method of processing messages as in claim 1 further comprising moving or copying an agent from one call center to another call center.

14. An apparatus for processing messages in a networked automatic contact distribution system having a plurality of computer processors each using a protocol of a plurality of protocols comprising:
   means within a processor of the plurality of processors for receiving a configuration message composed in one of the plurality of protocols;
   means within the processor for determining the protocol of the configuration message of the plurality of the protocols by comparing a preamble of the configuration message with a set of distinguishing characteristics of each of the plurality of protocols, and for identifying a location of metadata contained within the configuration message based upon the protocol of the configuration message;
   means within the processor for determining a type of a plurality of types of the configuration message from the metadata contained within the message; and
   means within the processor for executing a predetermined set of steps based upon the determined type of the configuration message.

15. The apparatus for processing messages as in claim 14 further comprising means for reformatting the configuration message after determining the type of the configuration message.

16. The apparatus for processing messages as in claim 14 wherein the means for determining the type further comprises means for matching the metadata with a respective criteria for each of a plurality of predetermined types of configuration messages.

17. The apparatus for processing messages as in claim 16 wherein the means for matching the metadata with the criteria further comprises means for activating a subroutine associated with the matched criteria.

18. The apparatus for processing messages as in claim 17 wherein the means for receiving a configuration message further comprises means for opening a socket to a second processor of the plurality of processors under a protocol selected from the group consisting of TCP/IP, IP multicast, UDP and wireless.

19. The apparatus for processing messages as in claim 18 wherein the configuration message further comprises a new agent registration message and wherein the subroutine registers the new agent with a business system.

20. The apparatus for processing messages as in claim 18 wherein the configuration message further comprises an agent logging out of an automatic contact distributor of the networked automatic contact distribution network and wherein the subroutine removes the agent from an agent's list within another automatic call distributor of the networked automatic contact distribution network.

21. The apparatus for processing messages as in claim 18 wherein the configuration message further comprises an agent changing his password and wherein the subroutine writes a new password selected by the agent into a plurality of databases based upon the access privileges granted to the agent.

22. The method of processing messages as in claim 14 wherein the processor further comprises a terminal adapter coupled to an automatic contact distributor where the terminal adapter is disposed between an automatic contact distributor and an administrator of the of the networked automatic contact distribution system.

23. An apparatus for processing messages in a networked automatic contact distribution system having a plurality of computer processors each using a protocol of a plurality of protocols comprising:
   a processor of the plurality of processors that receives a configuration message composed in one of the plurality of protocols;
   a protocol processor that determines the protocol of the configuration message by comparing a preamble of the configuration message with a set of distinguishing characteristics of each of the plurality of protocols and that identifies a location of metadata contained within the configuration message based upon the protocol of the configuration message;
   a classification processor that classifies the configuration message into one of a plurality of different type of configuration messages from the metadata contained within the configuration message; and
   a respective subroutine associated with, each of the plurality of different types of configuration messages that processes the configuration message based upon the classification of the configuration message.

24. The apparatus for processing messages as in claim 23 further comprising reformatting the configuration message after determining the type of the configuration message.

25. The apparatus for processing messages as in claim 23 wherein the classification processor further comprises a respective criteria associated with each of a plurality of predetermined types of configuration messages that is matched with the metadata to determine the type of configuration message.

26. The apparatus for processing messages as in claim 23 further comprises a socket connecting the processor to a second processor of the plurality of processors under a protocol selected from the group consisting of TCP/IP, IP multicast, UDP and wireless.

27. The apparatus for processing messages as in claim 23 wherein the configuration message further comprises a new agent registration message and wherein the subroutine registers the new agent with a business system.

28. An apparatus for processing messages in a networked automatic contact distribution system having a plurality of computer processors each using a protocol of a plurality of protocols comprising:

a processor of the plurality of processors that receives a configuration message composed in one of the plurality of protocols;

a protocol processor that determines the protocol of the configuration message by comparing a preamble of the configuration message with a set of distinguishing characteristics of each of the plurality of protocols and that identified a location of metadata contained within the configuration message based upon the protocol of the configuration message;

a classification processor that determines a type of a plurality of types of the configuration message by comparing the metadata contained within the configuration message with a plurality of criteria; and a plurality of subroutines where each subroutine of the plurality of subroutines is associated with respective criteria of the plurality of criteria and that executes a predetermined set of steps to process the configuration message based upon the determined type of the configuration message.

29. A method of processing messages in a networked automatic contact distribution system having a plurality of computer processors each using a protocol of a plurality of protocols comprising:

a first processor of the plurality of processors receiving a configuration message composed in one of the plurality of protocols from a second processor of the plurality of processors;

the first processor determining the protocol of the configuration message by comparing a preamble of the configuration message with a set of distinguishing characteristics of each of the plurality of protocols, determining a location of metadata contained within the configuration message based upon the protocol of the configuration message and determining a type of a plurality of types of the configuration message from a predetermined field of the configuration message; and the first processor executing a predetermined set of steps based upon the determined type of the configuration message.

* * * * *